United States Patent [19]

Bush et al.

[11] Patent Number: 5,966,231
[45] Date of Patent: Oct. 12, 1999

[54] METHOD AND APPARATUS FOR ALIGNING MULTIPLE LASER BEAMS

[75] Inventors: Craig Palmer Bush; Philip Jerome Heink, both of Lexington; David Kurt Klaffenbach, Versailles; Thomas Campbell Wade, Lexington, all of Ky.

[73] Assignee: Lexmark International, Inc., Lexington, Ky.

[21] Appl. No.: 09/130,828

[22] Filed: Aug. 7, 1998

[51] Int. Cl.⁶ .................................................. G02B 26/08
[52] U.S. Cl. ........................ 359/204; 359/216; 359/217; 347/233
[58] Field of Search .................................. 359/204, 212, 359/216, 217, 900; 347/224, 225, 233, 243, 129, 134, 234–235, 241; 358/296, 300

[56] References Cited

U.S. PATENT DOCUMENTS

| | | | |
|---|---|---|---|
| 4,404,571 | 9/1983 | Kitamura | 346/108 |
| 4,423,426 | 12/1983 | Kitamura | 346/108 |
| 4,541,712 | 9/1985 | Whitney | 346/108 |
| 4,725,855 | 2/1988 | Arimoto et al. | 355/53 |
| 4,823,151 | 4/1989 | Miura | 346/160 |
| 4,905,025 | 2/1990 | Sakamoto et al. | 346/154 |
| 4,933,549 | 6/1990 | Fujioka et al. | 250/235 |
| 4,950,889 | 8/1990 | Budd et al. | 346/108 |
| 4,978,849 | 12/1990 | Goddard et al. | 250/236 |
| 4,978,976 | 12/1990 | Okino | 250/235 |
| 5,006,705 | 4/1991 | Saito et al. | 250/235 |
| 5,373,154 | 12/1994 | Chen | 250/235 |
| 5,426,528 | 6/1995 | Yamamoto et al. | 359/204 |
| 5,576,852 | 11/1996 | Sawada et al. | 358/475 |
| 5,578,819 | 11/1996 | Kataoka et al. | 250/235 |
| 5,883,731 | 3/1999 | Kasai | 359/204 |

*Primary Examiner*—James Phan
*Attorney, Agent, or Firm*—Frank Leach; John J. McArdle, Jr.

[57] ABSTRACT

Compensation for beam separation of multiple laser beams of a laser printer simultaneously scanning a photoconductor drum is automatically made. The time for the lead beam to travel a predetermined distance is ascertained and then the separation time between the lead beam and one of the remaining beams is determined. When using only one light sensor, the time for the lead beam to travel the predetermined distance is the scan time of the lead beam. When using two light sensors, the time for the lead beam to travel the predetermined distance is the time for the lead beam to travel between the two light sensors, which define the predetermined distance, in the same scan. This determination of the time for the lead beam to travel the predetermined distance and its separation time from another of the remaining beams is continuously made for all of the remaining beams even during printing. If the beam separation time of each of the remaining beams from the lead beam is large enough for the one light sensor to generate distinct pulses for the lead beam and any one of the remaining beams during the same scan, the separation time for any one of the laser beams can be directly measured in only one scan.

28 Claims, 10 Drawing Sheets

INITIAL VALUES:

STEP 1:

STEP 2:

METHOD AND APPARATUS FOR ALIGNING MULTIPLE LASER BEAMS

FIELD OF THE INVENTION

This invention relates to a method and apparatus for aligning laser beams in a multi-beam raster system and, more particularly, to a method and apparatus for continuously measuring laser beam separations in a multi-beam raster system and automatically compensating for drift in beam separation.

BACKGROUND OF THE INVENTION

It has previously been suggested to use a plurality of modulated laser or light beams for scanning a recording medium so that a plurality of lines is simultaneously recorded on the recording medium. Examples of this type of apparatus are disclosed in U.S. Pat. No. 5,426,528 to Yamamoto et al, U.S. Pat. No. 5,576,852 to Sawada et al, and U.S. Pat. No. 5,578,819 to Kataoka et al.

The use of a plurality of laser beams enables the throughput of a laser printer, for example, to be increased. With a print resolution of 600 dots per inch (dpi) in both scan and process directions (the present industry standard), a process-direction laser beam separation of 42 $\mu$m must exist. This separation, along with the optical magnification of the system, produces a spacing and tolerance between lasers not practical or desirable in manufacturing a semiconductor laser array.

Accordingly, a semiconductor laser array is manufactured to reasonable tolerances and then tilted until the required process-direction spacing of 42 $\mu$m for 600 dpi is achieved. This tilting results in the lasers in the array no longer being aligned vertically. Therefore, the tilt of the array produces a separation in the scan direction between each of the laser beams so that one laser beam leads the other beams as they sweep across a recording medium such as a rotating photoconductor drum, for example.

Changes in beam separation in a multi-beam scan can occur due to temperature, laser power, mirror facet variation (speed of mirror motor, configuration of facets of mirror, and other periodic events involving the mirror), or other variables. When the separation drift occurs, image distortion on the rotating photoconductor drum can occur.

SUMMARY OF THE INVENTION

The present invention solves the problems of compensating for changes in beam separation in the scan direction through continuously measuring the beam separation even during printing. When there is a detection of a change in beam separation, the method and apparatus of the present invention automatically compensates for such change.

In two embodiments of the present invention, the multiple beams simultaneously scan the photoconductor drum. By measuring the time for the lead beam to travel a predetermined distance and then determining the separation of each of the remaining beams with respect to the lead beam, continuous compensation for variations in the beam separation times is accomplished.

It should be understood that the separation time of each of the remaining beams from the lead beam is ascertained only after there is a determination of the time for the lead beam to travel the predetermined distance. That is, if four of the beams simultaneously scan the photoconductor drum, for example, then there would be three determinations of the time for the lead beam to travel the predetermined distance with the time of separation for a different one of the remaining three beams from the lead beam being made after determining each of the times for the lead beam to travel the predetermined distance.

The method and apparatus of the present invention can make these measurements with only a single light sensor in one of the two embodiments or a maximum of two light sensors in the other of the two embodiments. With either the single light sensor or the two light sensors, it is preferred that an averaging arrangement be employed so that an averaged accuracy error approaches zero.

With the single light sensor, two scans must be made to determine the scan time (the time that it takes the lead beam to travel the predetermined time) of the lead beam and a third scan to measure the separation time between the lead beam and one of the other beams. With the two light sensors, only one scan is required for measuring the time for the lead beam to travel the predetermined distance (the distance between the two light sensors), and one additional scan is needed to ascertain the separation time of one of the other beams from the lead beam.

In a third embodiment of the present invention, it is not necessary to determine the time for the lead beam to travel the predetermined distance. Instead, it is only necessary to determine the separation time of one of the other beams from the lead beam. This may be accomplished with a single light sensor.

An object of this invention is to provide a method and apparatus for automatically detecting changes in the separation time of beams from a lead beam in a multi-beam raster system in the scan direction and automatically compensating therefor.

Another object of this invention is to provide a method and apparatus for producing an average accuracy error of beam separation time in a multi-beam raster system in which the beam separation time error from the lead beam for each of the remaining beams approaches zero.

A further object of this invention is to provide a method and apparatus for aligning a plurality of laser beams, which simultaneously scan a recording medium, in which there is automatic compensation for changes in the separation time of any of the remaining beams from the lead beam even during printing.

Other objects of this invention will be readily perceived from the following description, claims, and drawings.

BRIEF DESCRIPTION OF THE DRAWINGS

The attached drawings illustrate preferred embodiments of the invention, in which.

DETAILED DESCRIPTION OF PREFERRED EMBODIMENTS

Figure 1:
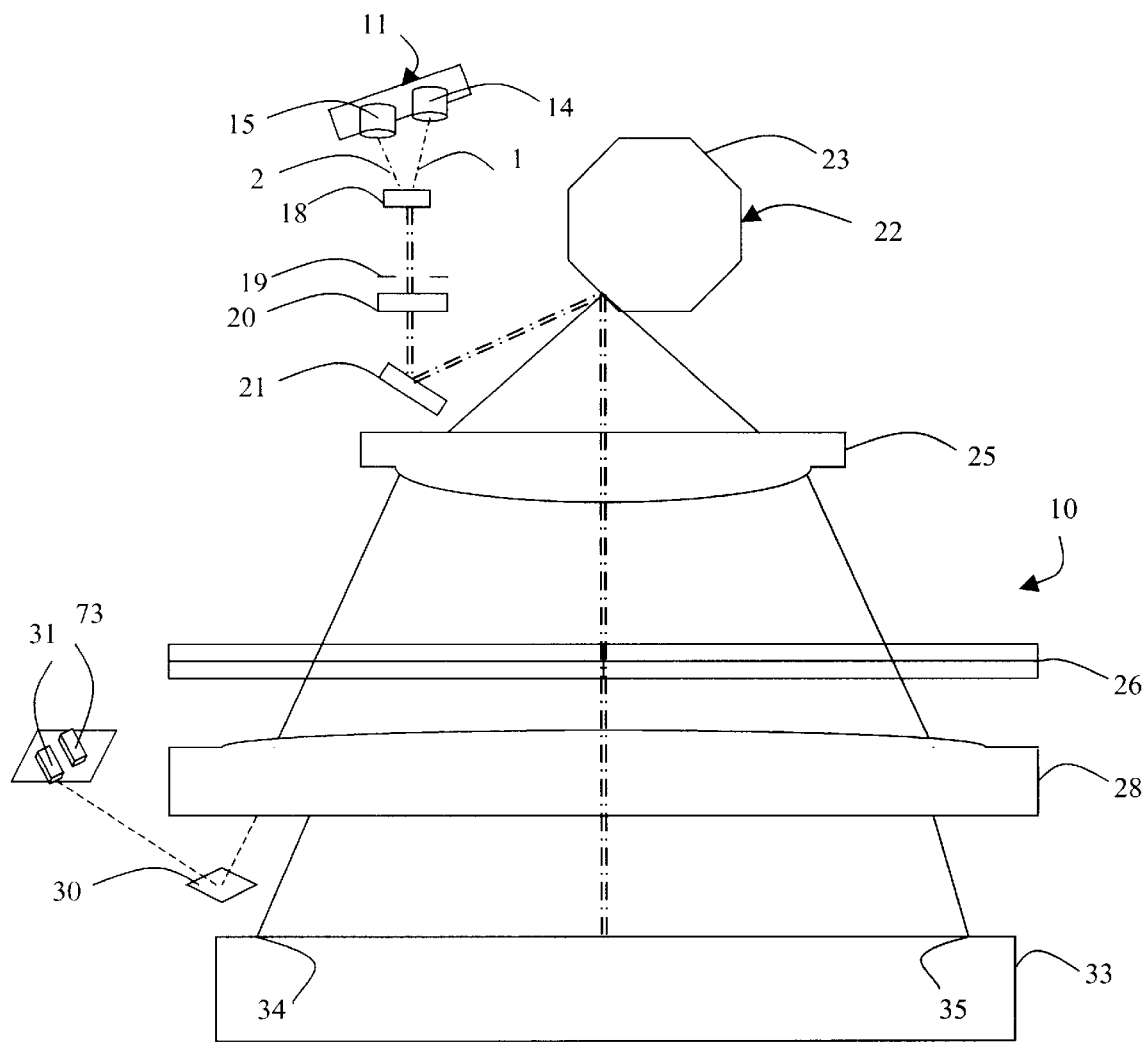
FIG. 1 is a schematic diagram of a multi-beam raster system of a laser printer having the measuring and compensating arrangement of the present invention.

Referring to the drawings and particularly FIG. 1, two laser or light beams 1 and 2 of a laser printer 10 are produced by a semiconductor laser diode array 11. The array 11 includes two laser diodes 14 and 15 producing the two laser or light beams 1 and 2, respectively. It should be understood that the laser diode array 11 could have more than two of the laser diodes to produce more than two of the laser or light beams, if desired.

The beams 1 and 2 pass through a collimator lens 18, which causes the beams 1 and 2 to be substantially parallel, an elliptical aperture stop 19, and a pre-scan lens 20 before striking a pre-scan mirror 21. The pre-scan mirror 21 reflects the two laser beams 1 and 2 onto a rotating polygonal mirror 22.

The mirror 22 is rotated counterclockwise (as viewed in FIG. 1). The mirror 22 has eight facets 23. It should be understood that the mirror 22 may have more or less than eight of the facets 23.

After being deflected by one of the facets 23 of the rotating mirror 22, the two beams 1 and 2 pass through a first lens 25. After passing through the first lens 25, a fold-down mirror 26 directs the beams 1 and 2 downwardly to pass through a second lens 28.

Figure 9:
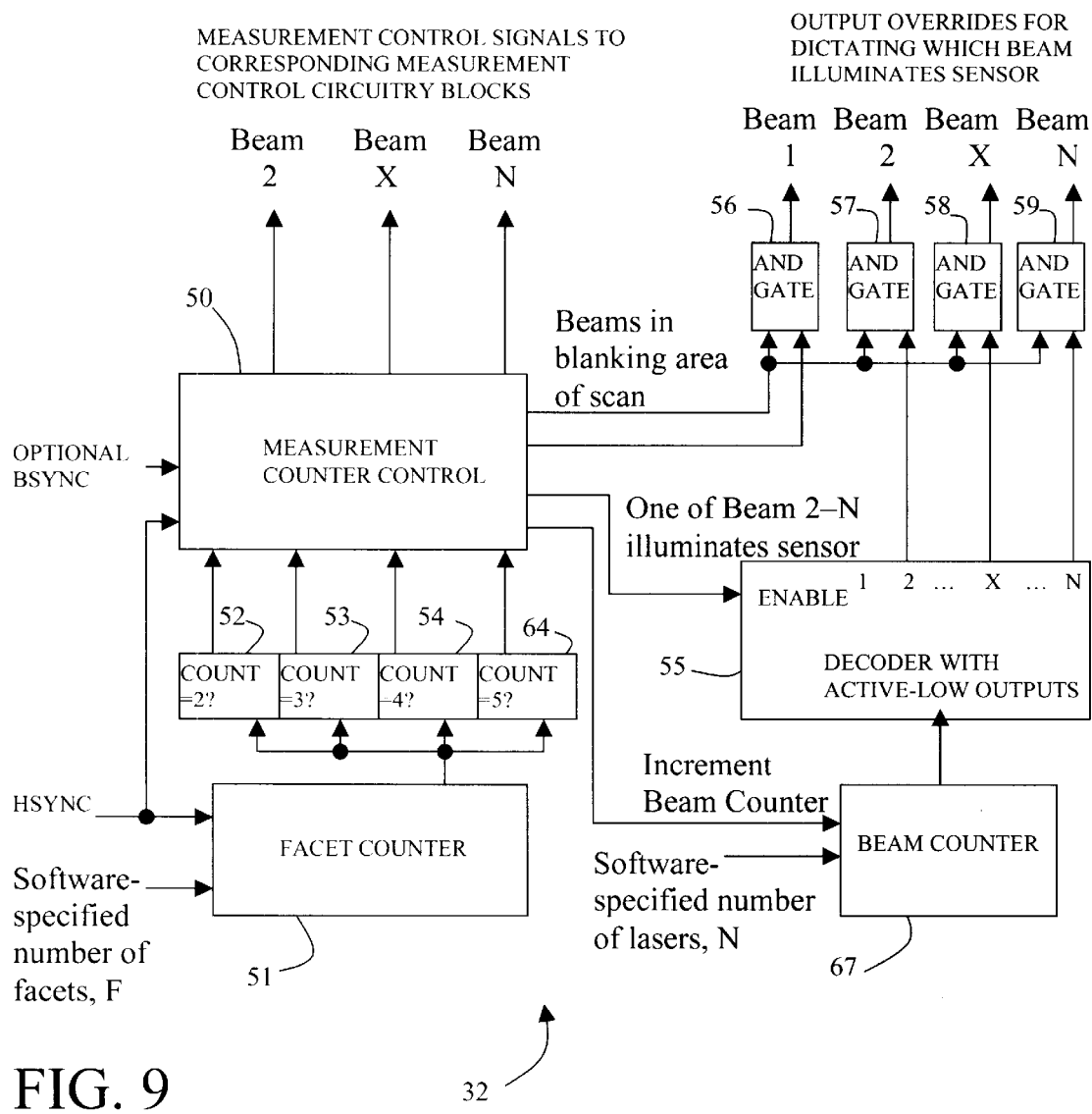
FIG. 9 is a schematic block diagram of an imaging control circuitry used with FIG. 7.

The beams 1 and 2 strike a sensor mirror 30 after exiting from the lens 28. The sensor mirror 30 reflects each of the beams 1 and 2 onto an HSYNC (horizontal synchronization) light sensor 31. The laser printer 10 has an imaging control circuitry 32 (see FIG. 9) for controlling when each of the beams 1 (see FIG. 1) and 2 is illuminated for sensing by the HSYNC sensor 31.

A rotating photoconductor drum 33, which is a recording medium, is scanned by each of the beams 1 and 2 simultaneously as the drum 33 is rotated. The laser diode array 11, the lenses 18, 20, 25, and 28, the elliptical aperture stop 19, the mirrors 21, 22, and 26, and the HSYNC light sensor 31 form a collection of image-forming components constituting a laser printhead. Thus, when the beams 1 and 2 exit the laser printhead, each of the beams 1 and 2 illuminates the surface of the drum 33 in accordance with its modulation and alters electric charge at the focal point.

Each of the beams 1 and 2 moves from left to right in a scan along the drum 33 as the drum 33 rotates in what is termed the process direction. Therefore, in a 600 dpi (dots per inch)×600 dpi printing system, each pel, which is a physical space corresponding to an image resolution of one bit of a memory bitmap, is 1/600" square. Accordingly, the time required for the beam 1 or 2 to sweep across a distance of 1/600" is referred to as the pel time.

Figure 2:
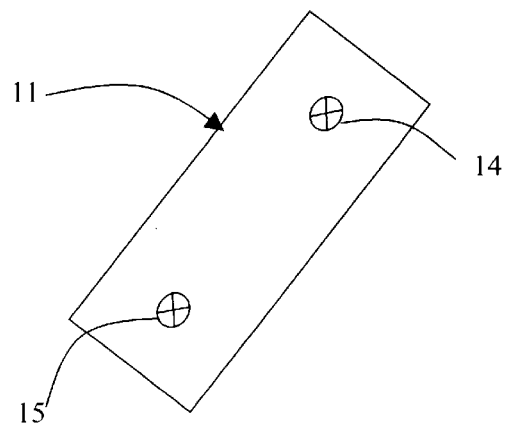
FIG. 2 is a schematic diagram of a semiconductor laser array of the multi-beam raster system of FIG. 1 with the array tilted to provide a required process-direction spacing.

A 600 dpi×600 dpi printing system requires a laser beam separation of 42 $\mu$m in the process direction. However, given the optical magnification of the system, this spacing and tolerance is not practical for the manufacture of the semiconductor laser array 11. Accordingly, as shown in FIG. 2, the array 11 is tilted at an angle. This enables the laser diodes 14 and 15 to have the desired process-direction spacing.

As the mirror 22 (FIG. 1) rotates counterclockwise, the beam 1 initially has its first pel of the printable portion of its scan strike the drum 33 at a point 34 and its last pel of the printable portion of its scan strike the drum 33 at a point 35. After the beam 1 reaches the last point 35, it traverses an unprintable or blanking portion of its scan before it abruptly appears back at the right side (the point 34) when the mirror 22 has rotated enough that the beam 1 strikes the next of the facets 23 of the mirror 22.

Thus, the beam 1 sweeps across the rotating drum 33. The beam 2 also sweeps across the rotating drum 33 substantially parallel to the sweep of the beam 1.

When the array 11 has N beams, N lines of bitmap data are written on the rotating drum 33 by the modulated N beams during each physical scan with the physical scan corresponding to the beams being directed by one of the facets 23 of the rotating mirror 22 to the rotating drum 33. Each line of the bitmap data must begin at the same physical offset from an edge of the rotating drum 33 to produce the bitmap image with accurate scan-to-scan alignment.

Each time that another of the facets 23 of the mirror 22 is rotated into the position where it directs the beams 1 and 2 to the beginning of a scan on the rotating photoconductor drum 33, the HSYNC sensor 31 generates a positional reference pulse. This positional reference pulse is used by the imaging control circuitry 32 (see FIG. 9) to determine when to start transmitting the bitmap data via the beams 1 (see FIG. 1) and 2.

Figure 3:
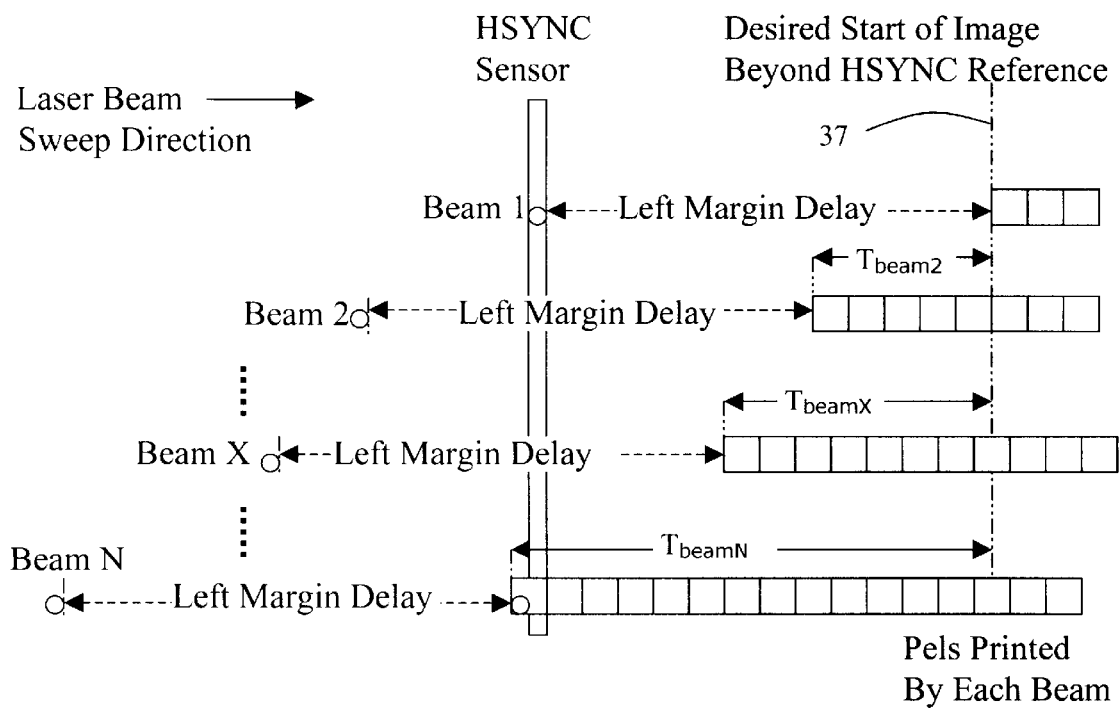
FIG. 3 is a schematic diagram showing the delays for each modulated beam to start printing at a reference margin without compensation for beam separation due to the semiconductor laser array being tilted and the errors produced thereby at the reference margin.

As shown in FIG. 3, the imaging control circuitry 32 (see FIG. 9) delays start of image transmission from when the HSYNC sensor 31 (see FIG. 3) generated its positional reference pulse by a predetermined fixed number of pels. This delay provides time for all of the imaging control circuitry 32 (see FIG. 9) to prepare for the upcoming image transmission so as to create a non-printable area at the beginning of a scan with this delay for each beam being identified in FIG. 3 as a Left Margin Delay.

When printing is to occur during a scan, the imaging control circuitry 32 (see FIG. 9) modulates the N beams according to their assigned lines of the bitmap image. However, because of the scan-direction separation created by the tilt of the array 11 (see FIG. 2) to obtain the proper process-direction beam spacing, compensation for the scan-direction separation is necessary. Otherwise, instead of the scans all beginning printing at a left (reference) margin 37 (see FIG. 3), each would begin printing after its Left Margin Delay. For example, the beam 2 would begin printing at a distance (time interval) of $T_{beam2}$ prior to the left margin 37 without compensation. Likewise, beam X would begin printing at a distance (time interval) of $T_{beamX}$ prior to the left margin 37 without compensation, and beam N would begin printing at a distance (time interval) of $T_{beamN}$ prior to the left margin 37 without compensation.

Figure 4:
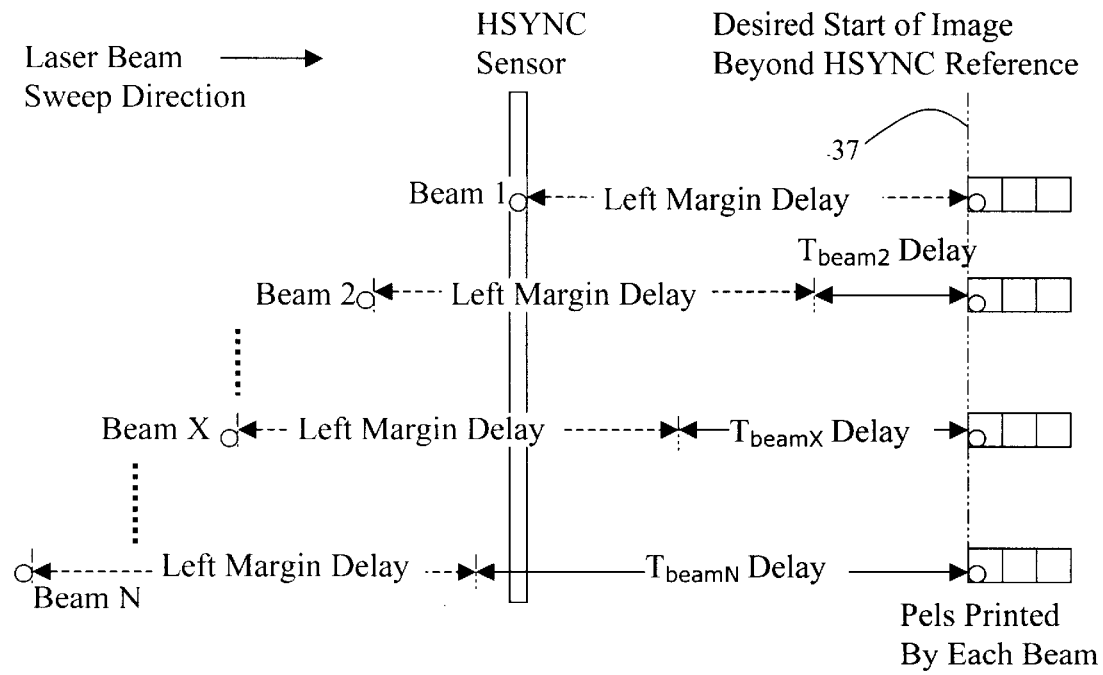
FIG. 4 is a schematic diagram, similar to FIG. 3, showing the desired delays to have each modulated beam start printing at a reference margin with compensation for beam separation due to the semiconductor laser array being tilted.

The present invention measures the time interval $T_{beamX}$ for each of the laser beams in an N-beam system with X ranging from 2 to N. Upon the expiration of Left Margin Delay, the bitmap image transmission of each of the laser beams is delayed by $T_{beamX}$ Delay (see FIG. 4), its own measured time interval $T_{beamX}$, where X ranges from 2 to N. This enables each of the beams to be able to begin printing at the left margin 37 as shown in FIG. 4. The first two printed pels by each of the beams scanning the drum 33 (see FIG. 1) are identified in FIG. 4 as PEL 1 and PEL 2.

Figure 5:
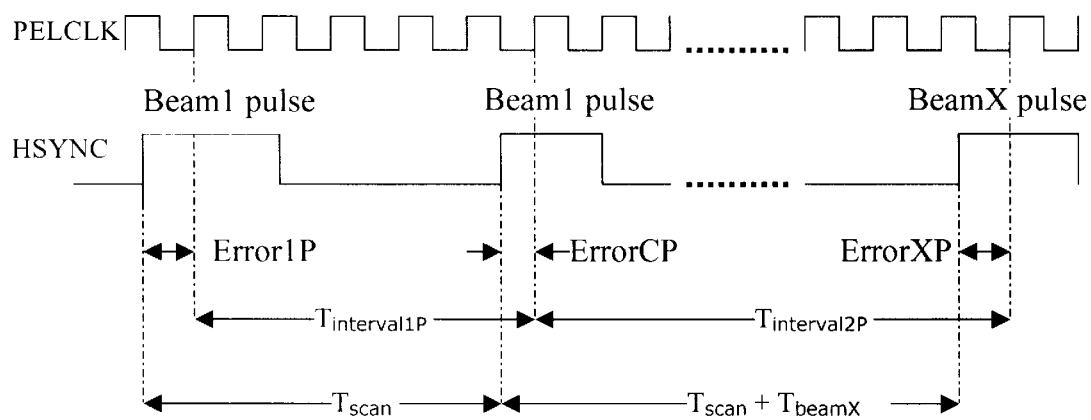
FIG. 5 is a timing diagram showing the asynchronous relation between pulses produced by a light sensor and a pel clock.

The scan time between two scans can be ascertained through measuring the time between when a first HSYNC pulse (see FIG. 5) goes high during a first scan when the HSYNC sensor 31 (see FIG. 1) is illuminated by the beam 1, which is the lead beam since it is the first beam of the scan, and when the HSYNC sensor 31 is illuminated by the beam 1 during a second scan to cause a second high HSYNC pulse (see FIG. 5). This provides the scan time between the two scans and is identified in FIG. 5 as $T_{scan}$.

When the beam 2 or another beam, identified as beam X in FIG. 5 when there are more than the beams 1 (see FIG. 1) and 2, illuminates the HSYNC sensor 31 during a third scan, the HSYNC sensor 31 produces a third high HSYNC pulse, which is identified in FIG. 5 as beamX pulse. Therefore, the distance (time interval) from the second HSYNC pulse to the third HSYNC pulse is identified as $T_{scan}+T_{beamX}$ as shown in FIG. 5 where X ranges from 2 to N.

$$\text{Thus}, T_{scan}+T_{beamX}-(T_{scan})=T_{beamX} \quad (1).$$

Equation (1) provides the separation time of the beam X from the beam 1 and would constitute the $T_{beamX}$ Delay in FIG. 4 from the end of the Left Margin Delay to the left margin 37.

However, as shown in FIG. 5, the HSYNC pulses are asynchronous to PELCLK pulses of a continuously running pel clock. Each of the PELCLK pulses has a period of one pel time. As previously mentioned, one pel time is the time required for any of the beams to sweep across the physical space corresponding to one bit of the image resolution.

The state of the HSYNC signal is sampled on each rising edge of a PELCLK pulse. Therefore, there can be an error of 0–1 PELCLK period for each time that the HSYNC pulse goes high.

In the example shown in FIG. 5, the PELCLK pulse goes up by an error of Error1P after the first HSYNC pulse goes high. There is a first time interval, $T_{interval1P}$ from the time that the PELCLK clock goes up after the first HSYNC pulse goes high until another of the PELCLK pulses goes up after the second HSYNC pulse has gone high.

The time between when the second HSYNC pulse goes up until a third HSYNC pulse goes high in FIG. 5 is $T_{scan}+T_{beamX}$. The time between when the second HSYNC pulse goes up and the next of the PELCLK pulses goes high is indicated by an error of ErrorCP. The time between when the third HSYNC pulse goes high until the next PELCLK pulse goes up is indicated by an error of ErrorXP. The time interval between when the first PELCLK pulse went up after the second HSYNC pulse went high to the time when another of the PELCLK pulses went up after the third HSYNC pulse went high is $T_{interval2P}$.

$$\text{Thus, in FIG. 5}, T_{scan}=T_{interval1P}+(\text{Error1P}-\text{ErrorCP}) \quad (2).$$

$$\text{Also from FIG. 5}, T_{scan}+T_{beamX}=T_{interval2P}+(\text{ErrorCP}-\text{ErrorXP}) \quad (3).$$

Accordingly, equation (1) can be replaced by subtracting equation (2) from equation (3). Therefore, $$T_{scan}+T_{beamX}-(T_{scan})=T_{interval2P}+(\text{ErrorCP}-\text{ErrorXP})-(T_{interval1P}+(\text{Error1P}-\text{ErrorCP})) \quad (4).$$

Rearranging equation (4):

$$T_{interval2P}-T_{interval1P}=T_{beamX}=(\text{Error1P}+\text{ErrorXP}-2*\text{ErrorCP}) \quad (5).$$

Because each of the error terms varies independently from 0–1 pel, the cumulative error in the PELCLK-based $T_{beamX}$ determination is ±2 pels. Therefore, a measurement and compensation system based solely on PELCLK pulses could only align 600 dpi scans to 1/300" (2 pels). In some print patterns, this is an error easily visible to the unaided eye.

To achieve beam-to-beam synchronization accurate enough to prevent visible misalignment, the present invention also utilizes a continuously running slice clock. The slice clock produces SLICECLK pulses with each equal to one slice time.

Figure 6:
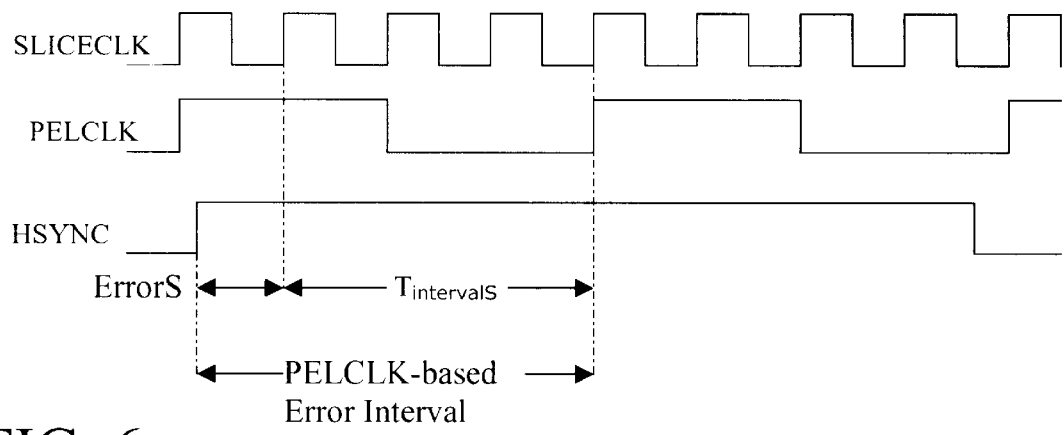
FIG. 6 is a timing diagram of the relation between pulses produced by a light sensor, a pel clock, and a slice clock.

As shown in FIG. 6, each pel time includes four slice times although the number of slices per pel may be any desired number. The SLICECLK and PELCLK pulses have a synchronous relationship. FIG. 6 shows a portion of one HSYNC pulse, two complete PELCLK pulses, and eight complete SLICECLK pulses.

The time interval between when the HSYNC pulse goes up until the next SLICECLK pulse rises is indicated by ErrorS. The time interval from when the SLICECLK pulse goes high after the HSYNC pulse has gone up until the PELCLK pulse goes up for the same high HSYNC pulse is indicated by $T_{interval S}$. These two times are equal to PELCLK-based Error Interval and can be indicated by the following equation:

$$\text{PELCLK-based Error}=T_{interval S}+\text{ErrorS} \quad (6).$$

Substituting the relation of equation (6) for each PELCLK-based Error in equation (5) produces:

$$T_{interval2P}-T_{interval1P}=T_{beamX}+((T_{interval1S}+\text{Error1S})+(T_{intervalXS}+\text{ErrorXS})-2*(T_{intervalCS}+\text{ErrorCS})) \quad (7).$$

Placing all time intervals for which compensation will be applied on one side of equation (7) yields:

$$(T_{interval2P}-T_{interval1P})+(2*T_{intervalCS}-T_{interval1S}-T_{intervalXS})=T_{beamX}+(\text{Error1S}+\text{ErrorXS}-2*\text{ErrorCS}) \quad (8).$$

All the error terms in equation (8) vary independently from 0–1 slice. Thus, by using the SLICECLK-based logic level for measuring and compensating, the difference between two time intervals can be calculated with an accuracy of ±2 slices.

The PELCLK-based compensation term of $T_{interval2P}-T_{interval1P}$ is always positive because the tilt of the array 11 (see FIG. 2) causes the beam 1 to always lead the other beams. However, each SLICECLK-based time interval has a value from 0 to SPP-1 where SPP is the number of slices comprised in each pel. Therefore, the net value of the SLICECLK-based compensation term can be any value between ±2*(SPP-1).

To avoid the net value of the SLICECLK-based term being negative, it is preferred to add a constant delay for the beam 1 (see FIG. 1) and load a SLICECLK-based measurement counter 38 (see FIG. 7) with the same delay to start each $T_{beamX}$ measurement cycle. Since the range of the net value of the SLICECLK-based compensation term is ±2*(SPP-1), preloading the counter 38 with 2*SPP at the beginning of each $T_{beamX}$ measurement cycle insures that the final result is positive. Thus, with four slices per pel, the preload count in the counter 38 would be 8.

Figure 7:
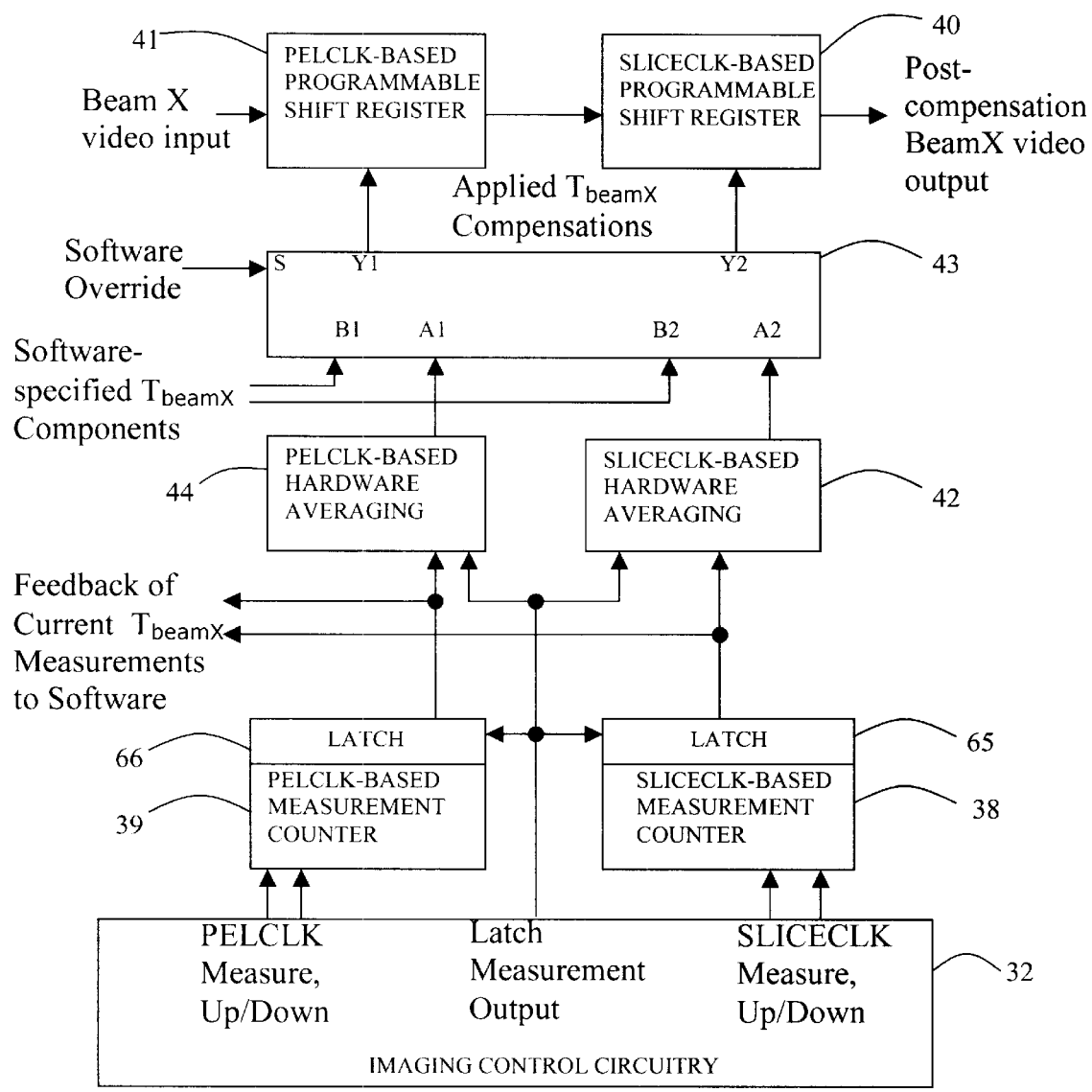
FIG. 7 is a schematic block diagram of measurement circuitry for determining the compensation delay for when a modulated beam starts printing during each scan including an averaging circuitry.
Figure 8:
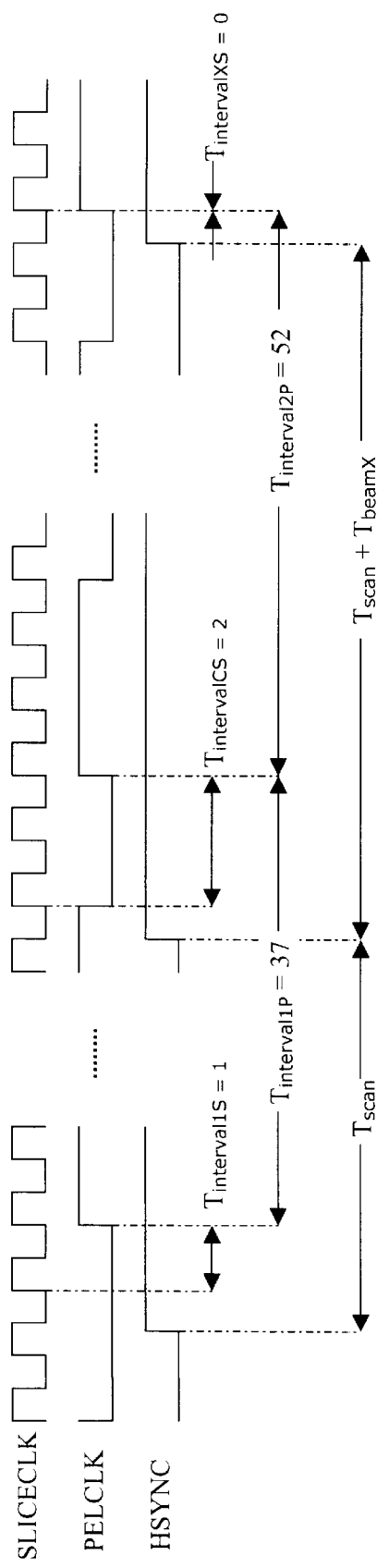
FIG. 8 is a timing diagram of the relation between pulses produced by a light sensor, a pel clock, and a slice clock with numerical values for various time intervals and errors.

FIG. 8 discloses an example of how the present invention works with SLICECLK-based delay circuitry for the beam X. With the counter 38 (see FIG. 7) preloaded with a value of 8 as previously mentioned, the first rising edge of a SLICECLK pulse (see FIG. 8) after the HSYNC pulse has gone up causes the counter 38 (see FIG. 7) to be decremented by a count of one for each SLICECLK pulse (see FIG. 8) until the PELCLK pulse goes high. The time interval $T_{interval1S}$ has a minus sign in equation (8). Accordingly, the counter 38 (see FIG. 7) is decremented to a count of 7 since the PELCLK pulse (see FIG. 8) goes up at the same time as the next SLICECLK pulse due to their clocks being synchronous.

When the PELCLK pulse goes up after the HSYNC pulse has gone high, the time interval $T_{interval1P}$ is counted. A PELCLK-based counter 39 (see FIG. 7) is decremented by a count of one each time that the PELCLK pulse (see FIG. 8) goes up; the SLICECLK-based counter 38 (see FIG. 7) holds at the count of 7.

When the SLICECLK pulse (see FIG.8) goes high after the HSYNC pulse again goes up, the time interval $T_{intervalCS}$ is counted by incrementing the counter 38 (see FIG. 7) until the PELCLK pulse (see FIG. 8) goes high. This rising edge of the PELCLK pulse signals the end of the time interval $T_{intervalCS}$ to stop the count in the SLICECLK-based counter 38 (see FIG. 7) at 11. The count is at 11 because each count for the time interval $T_{intervalsCS}$ (see FIG. 8) increments the SLICECLK-based counter 38 (see FIG. 7) by 2 as equation (8) specifies.

This same rising edge of the PELCLK pulse causes the PELCLK-based counter 39 to stop counting the time interval $T_{interval1P}$ (see FIG. 8). It also causes the PELCLK-based counter 39 (see FIG. 7) to start counting the time interval $T_{interval2P}$ (see FIG. 8). Thus, the counter 39 (see FIG. 7) has a count value of –37, according to FIG. 8, at the end of the time interval $T_{interval1P}$.

Counting in the PELCLK-based counter 39 (see FIG. 7) of the time interval $T_{interval2P}$ (see FIG. 8) begins as soon as counting of the time interval $T_{interval1P}$ ceases. The PELCLK-based counter 39 (see FIG. 7) is now incremented by one each time that a PELCLK pulse (see FIG. 8) goes high. This is because the time interval $T_{interval2P}$ is positive in equation (8).

After a third HSYNC pulse rises, each of the SLICECLK pulse (see FIG. 8) and the PELCLK pulse goes high at the same time. As a result, the SLICECLK-based counter 38 (see FIG. 7) remains at a count of 11 since there is no counting of the SLICECLK pulses (see FIG. 8) when the PELCLK pulse goes up. The PELCLK-based counter 39 (see FIG. 7) stops counting the time interval $T_{interval2P}$ (see FIG. 8) at the same time so that the counter 39 (see FIG. 7) has a count of 15 [52(for $T_{interval2P}$)–37 (for $T_{interval1P}$)] as shown in FIG. 8.

The count of 11 in the counter 38 (see FIG. 7) could be supplied directly to a programmable shift register 40. The value of 15 in the counter 39 could be supplied directly to a programmable shift register 41.

This would result in the delay of the beam X relative to the beam 1, the lead beam, by 15 pels in the PELCLK logic area and by 11 slices in the SLICECLK logic area. The beam 1 has a constant delay of 8 slices (2 pels) applied to it. Therefore, there would be a delay of 15 pels and 3 (11–8) slices of the beam X relative to the beam 1 if the values in the counters 38 and 39 were supplied directly to the shift registers 40 and 41, respectively.

However, while the separation time between the beams should not vary significantly from scan to scan, differences between the facets 23 (see FIG. 1) of the mirror 22, jitter of the motor rotating the mirror 22, and other periodic events may cause variation in the length of the time intervals measured to calculate the time interval $T_{beamX}$. In a 600 dpi, 34 page per minute single laser printing system, the intervals between HSYNC pulses (see FIG. 8) may vary as many as 4 pels. While the cyclical variations still average out to zero over time, the $T_{beamX}$ calculations made over the course of the cyclical variation period may differ from each other enough to cause visible misalignment of the printed material.

Accordingly, to reduce the effects of variations in the time intervals being measured, it is preferred to include an averaging circuit to reduce the effects of variations in the measured time intervals. To accomplish this, the counts in the counters 38 (see FIG. 7) and 39 preferably are not sent directly to the inputs of the programmable shift registers 40 and 41, respectively.

Instead, as shown in FIG. 7, the count in the counter 38 for the time interval $T_{beamX}$ is supplied through a SLICECLK-based hardware averaging circuit 42 and a multiplexer 43 as an input to the SLICECLK-based programmable shift register 40. Likewise, the count in the counter 39 for the time interval $T_{beamX}$ is supplied through a PELCLK-based hardware averaging circuit 44 and the multiplexer 43 as an input to the PELCLK-based programmable shift register 41.

For either the SLICECLK-based logic or the PELCLK-based logic, the formula for a new weighted average of the time interval $T_{beamX}$ is:

$$\text{New S\_avg} = s/Z + S\_avg*(Z-1)/Z \qquad (9).$$

In equation (9), $S\_{avg}$ is the current weighted average of $T_{beamX}$ measurements, s is the current measurement of $T_{beamX}$, and Z is a weight factor for the current average (S_avg) against the current measurement (s). Rearranging, equation (9) may be written as:

$$\text{New S\_avg} = [(s - S\_avg) + Z*S\_avg]/Z \qquad (10).$$

Equation (10) is readily implemented in the averaging hardware circuit 42 or 44 using adders and subtractors where Z is limited to powers of 2 such as 1, 2, 4, or 8, for example. Increasing the value of Z dampens the weighted average's response to variations in s, the current time interval $T_{beamX}$ measurement, in equation (10). This prevents large scan-to-scan swings in the applied compensation value. As a result, cyclical variations in s, current $T_{beamX}$ measurement, will not cause visible misalignment between the beams in the printed material. This hardware averaging scheme may be applied to both the PELCLK-based and SLICECLK-based measurements.

Figure 11:
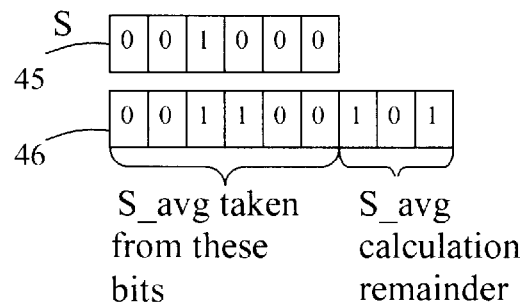
FIG. 11 is a schematic block diagram of two registers and a scratch register and showing the two steps utilized in a portion of the hardware averaging circuits of FIG. 7.
Figure 11:
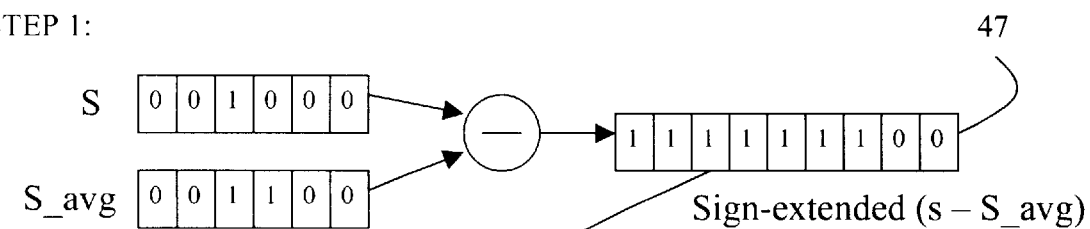
Figure 11:
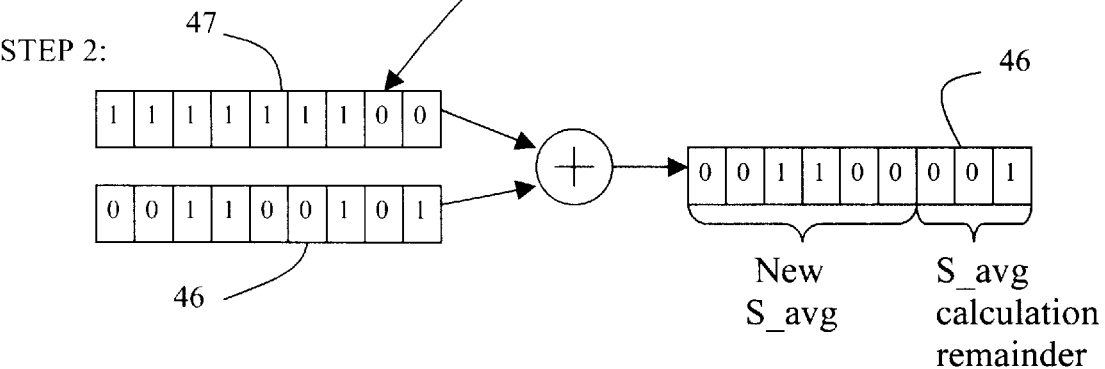

FIG. 11 illustrates how the hardware averaging circuit 42 (see FIG. 7) or 44 operates with equation (10). In the example of FIG. 11, $Z=8(2^3)$, s=8, and S_avg=12 with a remainder of $5/2^3$. All mathematical operations are signed either positive or negative.

As shown in FIG. 11, the initial value of s in a six bit current measurement register 45 is 8. In an averaging register 46, the six most significant bits provide S_avg=12. The three least significant bits of the averaging register 46 constitute the S_avg calculation remainder of 5.

In the first step, the current average, S_avg, of 12 in the averaging register 46 is subtracted from the current measurement, s, of 8 in the current measurement register 45 to obtain the (s–S_avg) term of equation (10). This subtraction produces the sum of −4 in the six least significant bits of a scratch register 47 of step 1 of FIG. 11.

In step 2, the sum of −4 in the scratch register 47 is added to Z*S_avg value of 101 in the nine bits of the averaging register 46. By using the six most significant bits in the averaging register 46 as the New S_avg value and the three least significant bits of the averaging register 46 as the S_avg calculation remainder, the S_avg calculation remainder value decreases to 1 (5−4) and the New S_avg value remains at 12.

Therefore, while there was a substantial difference between the current measurement $T_{beamX}$ of 8 and the S_avg of 12, it did not change the weighted average. By lowering the S_avg calculation remainder in the averaging register 46 from 5 to 1, there would be a change of S_avg from 12 to 11 if the next value of s also was 8, for example.

Figure 10:
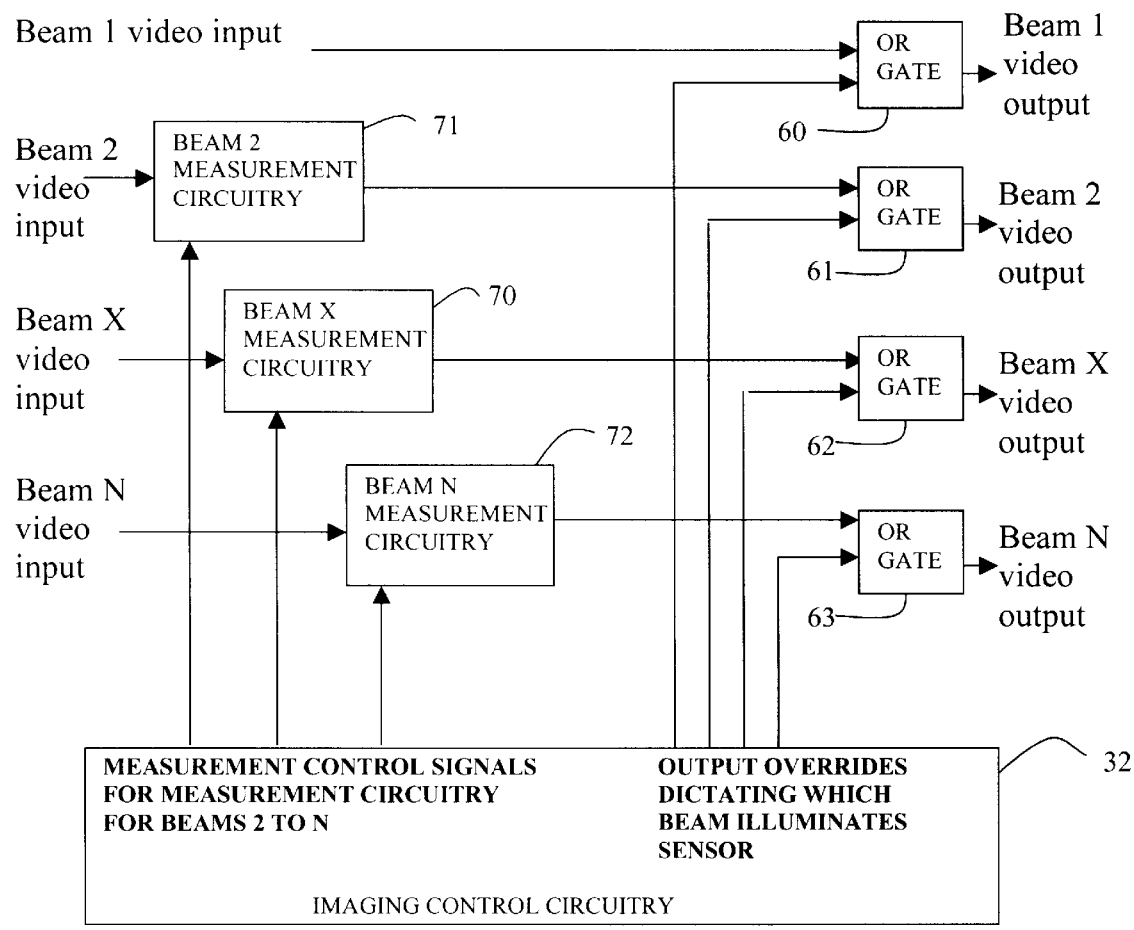
FIG. 10 is a schematic block diagram of the imaging control circuitry of FIG. 9 and the measurement circuitry of FIG. 7 for each of the beams.

As previously described, the imaging control circuitry 32 (see FIG. 9) controls when the HSYNC sensor 31 (see FIG. 1) is illuminated by the beam 1, the beam 2, or any of the remainder of the beams, identified in FIG. 10 by the beams X and N, during a scan. The imaging control circuitry 32 (see FIG. 9) includes a measurement counter control 50 for controlling when the count in each of the counters 38 (see FIG. 7) and 39 is latched. The imaging control circuitry 32 (see FIG. 9) receives the HSYNC signals from the HSYNC sensor 31 (see FIG. 1) and has a counter therein to count each time that the HSYNC pulse goes up.

The imaging control circuitry 32 (see FIG. 9) preferably also provides a register, which receives from software in the laser printer 10 (see FIG. 1) information as to how many of the facets 23 that the mirror 22 has. With this information, the imaging control circuitry 32 (see FIG. 9) is preferably configured by the software to take a $T_{beamX}$ measurement every F−1 facets on a mirror having F facets. Thus, with the mirror 22 (see FIG. 1) having eight of the facets 23, F=8.

By having the imaging control circuitry 32 (see FIG. 9) begin a new $T_{beamX}$ measurement every F−1 facets, the software in the laser printer 10 (see FIG. 1) insures that each measurement cycle uses a different set of the facets 23 of the mirror 22 and all of the facets 23 are used equally. Any timing irregularity specific to one of the facets 23 is averaged out by using the hardware averaging circuits 42 (see FIG. 7) and 44 for determining a New S_avg for the SLICECLK-based logic and the PELCLK-based logic, respectively.

The imaging control circuitry 32 (see FIG. 9) has a facet counter 51, which is a circular counter, that counts from 2 to F where F is the number of the facets 23 (see FIG. 1) on the mirror 22. The facet counter 51 (see FIG. 9) is incremented once each time that the HSYNC pulse goes up. This results in the facet counter 51 repeating every F−1 facets.

When the count in the facet counter 51 is 2, 3, or 4 (the first three counts in a measurement cycle), these counts in the facet counter 51 cause comparators 52, 53, and 54 to sequentially provide a high pulse to the measurement counter control 50. The output of the comparator 52 is high during the first of the three scans to obtain a $T_{beamX}$ measurement, the output of the comparator 53 is up during the second of the three scans, and the output of the comparator 54 is high during the third of the three scans.

When the facet counter 51 is at a count of 4 (third scan) so that the comparator 54 has a high output, the measurement counter control 50 produces a high ENABLE signal as soon as the output of the comparator 54 goes up. The high ENABLE signal is supplied to a decoder 55 and an AND gate 56.

The decoder 55 supplies a low output to one of three AND gates 57, 58, and 59 each time that the ENABLE signal goes high during a measurement cycle. The AND gate 57 receives the low output of the decoder 55 when the beam 2 is to have its separation time from the beam 1 measured, the AND gate 58 receives the low output of the decoder 55 when the beam X is to have its separation time from the beam 1 measured, and the AND gate 59 receives the low output of the decoder 55 when the beam N is to have its separation time from the beam 1 measured. Thus, the output of the decoder 55 identifies the new beam to be measured prior to the HSYNC pulse going high due to the new beam illuminating the HSYNC sensor 31 (see FIG. 1).

When the beams are not over the blanking (non-printing) area of the scan, the input to each of the AND gates 56–59 is low because of the beams not being in the blanking area. Thus, the output of each of the AND gates 56–59 is low so that the output of each of OR gates 60 (see FIG. 10), 61, 62, and 63, which receive the outputs of the AND gates 56, 57, 58, and 59, respectively, as inputs, depends upon its video data input. Therefore, its video data input determines whether each of the beams 1, 2, X, and N turns on or off.

Each of the beams 1, 2, X, and N is turned on only when the output of its OR gate is low. When the output of each of the AND gates 56–59 (see FIG. 9) is high, then each of the OR gates 60–63 (see FIG. 10) has a high, and the beams 1, 2, X, and N are off.

Thus, during blanking, one of the inputs to each of the AND gates 56–59 (see FIG. 9) is high. Accordingly, when the AND gate 58, for example, has a low input from the decoder 55, its output is low so that the OR gate 61 (see FIG. 10) has a low output to turn on the beam X.

The high ENABLE pulse to the AND gate 56 insures that its output is always high when one of the other beams is to illuminate the HSYNC sensor 31 (see FIG. 1). When the ENABLE signal is low, only the AND gate 56 (see FIG. 9) has a low output so that the beam 1 illuminates the HSYNC sensor 31 (see FIG. 1).

The measurement counter control 50 controls when each of the counters 38 (see FIG. 7) and 39 counts during each of the three scans of a beam measuring cycle. After the three scans of a beam measuring cycle are completed, a comparator 64 (see FIG. 9) goes high to cause a latch measurement output signal to be supplied to each of latches 65 (see FIG. 7) and 66 for latching the counts in the counters 38 and 39, respectively. The latch measurement output signal also latches the values in the hardware averaging circuits 42 and 44. Thus, these values are stored until the next measuring cycle for the same beam.

The latch measurement output signal from the measurement counter control 50 (see FIG. 9) also is supplied to a beam counter 67 to increment its count by one. The beam counter 67 is a circular counter counting from 2 to N where N is the number of laser beams. Accordingly, after the values are latched in the counters 38 (see FIG. 7) and 39 and the hardware averaging circuits 42 and 44 during a measuring cycle, the count in the beam counter 67 is incremented by one to shift the low output of the decoder 55 to the next of the beams other than the beam 1 for use during the next measuring cycle.

Instead of using the hardware averaging circuits 42 and 44 to average the current $T_{beamX}$ measurements, the outputs of the counters 38 and 39 may be supplied to software in the laser printer 10 (see FIG. 1). The software will supply specified values to the programmable shift registers 40 (see FIG. 7) and 41 through the multiplexer 43 in accordance with inputs to the software from the counters 38 and 39, respectively. When the software is used, the multiplexer 43 receives a signal from the software to allow inputs from the software to the multiplexer 43 to be supplied to the programmable shift registers 40 and 41, respectively.

It should be understood that the counters 38 and 39, the programmable shift registers 40 and 41, the multiplexer 43, and the latches 65 and 66 constitute a measurement circuitry 70 (see FIG. 10) for the beam X. Each of a measurement circuitry 71 for the beam 2 and a measurement circuity 72 for the beam N is the same as the measurement circuitry 70.

As shown in FIG. 1, a BSYNC (beam synchronization) light sensor 73 also may be utilized in conjunction with the HSYNC light sensor 31 to form an alternate embodiment. The BSYNC sensor 73 is in the scan path just after the HSYNC sensor 31 with PELCLK-based time intervals being measured from the HSYNC sensor 31 to the BSYNC sensor 73 rather than from two separate scans of the beam 1 illuminating the HSYNC sensor 31. This reduces the measured time intervals to a much smaller portion of the scan time so that virtually all of the mirror motor velocity error is eliminated.

Figure 12:
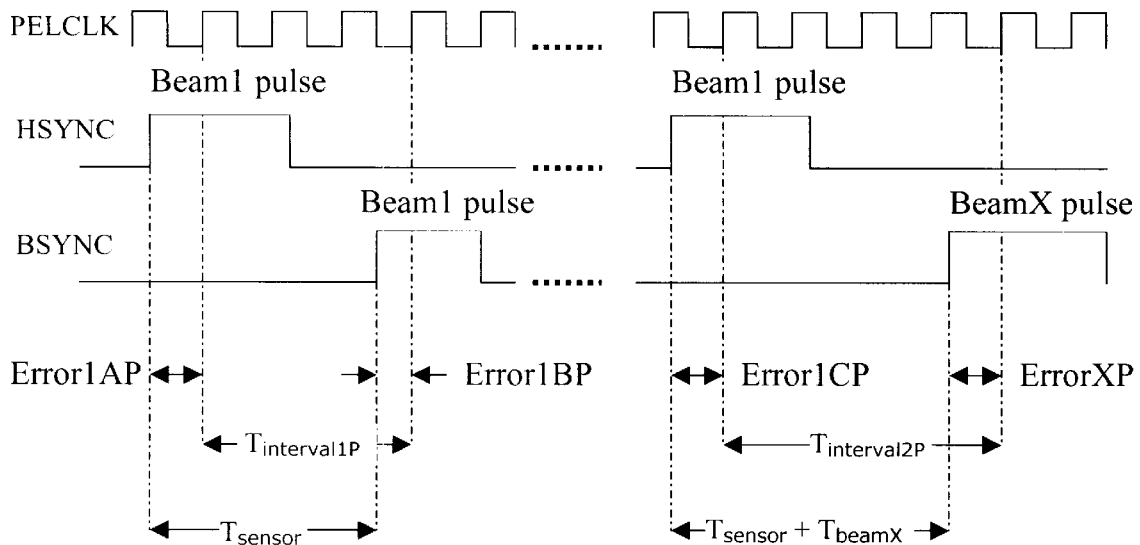
FIG. 12 is a timing diagram showing the asynchronous relation between pulses produced by two light sensors and a pel clock in a second embodiment of the present invention.

The time for the lead beam to travel the predetermined distance in the same scan can be ascertained through measuring the time between when a first HSYNC pulse (see FIG. 12) goes high during a first scan when the HSYNC sensor 31 (see FIG. 1) is illuminated by the beam 1, which is the lead beam since it is the first beam of the scan, and when the BSYNC sensor 73 is illuminated by the beam 1 in the same scan to cause a first high BSYNC pulse (see FIG. 12). This provides the sensor time between the two sensors 31 (see FIG. 1) and 73 and is identified in FIG. 12 as $T_{sensor}$.

In a second scan, the HSYNC sensor 31 (see FIG. 1) produces a second high HSYNC pulse (see FIG. 12) when the beam 1 illuminates the HSYNC sensor 31 (see FIG. 1). When the beam 2 or another beam, identified as the beam X in FIG. 12 when there are more than the beams 1 (see FIG. 1) and 2, illuminates the BSYNC sensor 73 during the second scan, the BSYNC sensor 73 produces a second high BSYNC pulse, which is identified in FIG. 12 as a beamX pulse. Therefore, the distance (time interval) from the second HSYNC pulse to the second BSYNC pulse is identified as $T_{sensor}+T_{beamX}$ as shown in FIG. 12 where X ranges from 2 to N.

$$\text{Thus}, T_{sensor}+T_{beamX}-(T_{sensor})=T_{beamX} \quad (11).$$

Equation (11) provides the separation time of the beam X from the beam 1 and would constitute the $T_{beamX}$ Delay in FIG. 4 from the end of the Left Margin Delay to the left margin 37.

However, as shown in FIG. 12, the HSYNC and BSYNC pulses are asynchronous to PELCLK pulses of a pel clock. Each of the PELCLK pulses has a period of one pel time.

The state of each of the HSYNC and BSYNC signals is sampled on each rising edge of a PELCLK pulse. Therefore, there can be an error of 0–1 PELCLK period for each time that the HSYNC or BSYNC pulse goes high.

In the example shown in FIG. 12, the PELCLK pulse goes up by an error of Error1AP after the first HSYNC pulse goes high. There is a first time interval, $T_{interval1P}$, from the time that the PELCLK pulse goes up after the first HSYNC pulse goes high until another of the PELCLK pulses goes up after the first BSYNC pulse has gone high.

The time between when the second HSYNC pulse goes up until the second BSYNC pulse goes high in FIG. 12 is $T_{sensor}+T_{beamX}$. The time between when the second HSYNC pulse goes up and the next of the PELCLK pulses goes high is indicated by an error of Error1CP. The time between when the second BSYNC pulse goes high until the next PELCLK pulse goes up is indicated by an error of ErrorXP. The time interval between when the PELCLK pulse went up after the second HSYNC pulse went high to the time when another of the PELCLK pulses went up after the second BSYNC pulse went high is $T_{interval2P}$.

Thus, in FIG. 12, $$T_{sensor}=T_{interval1P}+(\text{Error1AP}-\text{Error1BP}) \quad (12).$$

Also from FIG. 12, $$T_{sensor}+T_{beamX}=T_{interval2P}+(\text{Error1CP}-\text{ErrorXP})+tm \quad (13).$$

Accordingly, equation (11) can be replaced by subtracting equation (12) from equation (13). Therefore, $$T_{sensor}+T_{beamX}-(T_{sensor})=T_{interval2P}+(\text{Error1CP}-\text{ErrorXP})-(T_{interval1P}+(\text{Error1AP}-\text{Error1BP}))+tm \quad (14).$$

Rearranging equation (14):

$$T_{interval2P}-T_{interval1P}=T_{beamX}+(\text{Error1AP}-\text{Error1BP}+\text{ErrorXP}-\text{Error1CP})+tm \quad (15).$$

In the same manner as previously described for using only the HSYNC sensor 31 (see FIG. 1), a slice clock is employed to reduce the amount of error. Thus, the beam separation of each of the remaining beams from the beam 1, the lead beam, is determined similarly to that previously described when only the HSYNC sensor 31 is utilized.

As a result, the absolute variation of the PELCLK measurements will be smaller so that the output of each of the hardware averaging circuits 42 (see FIG. 7) and 44 will not fluctuate as much even with lower Z values in equation (10). This two-sensor system is preferred if the system exhibits significant periodic variations in the time intervals used to measure $T_{beamX}$.

When using the BSYNC sensor 73 (see FIG. 1), only the first two scans of a measuring cycle are used to determine the time for the beam 1 to travel the predetermined distance and to determine the separation time between the beam 1 and one of the remainder of the beams. Accordingly, the output of the comparator 53 (see FIG. 9) rather than the output of the comparator 54 is employed to cause the measurement counter control 50 to produce the high ENABLE signal. The comparator 54 is utilized to send the latch and beam counter signals. Since the remainder of the F-1 scans of a measuring cycle are not used, the comparator 64 is not employed when the two sensors 31 (see FIG. 1) and 73 are utilized.

When the beam 1 is sensed during each of the first two scans by only the HSYNC light sensor 31, the measured time is the scan time of the beam 1. This scan time also is the time for the beam 1 to travel the predetermined distance since it is the distance from when the beam 1 is at the HSYNC light sensor 31 in one scan until its arrival at the HSYNC light sensor 31 in the next scan. When both the HSYNC light sensor 31 and the BSYNC sensor 73 are used, the distance between the HSYNC light sensor 31 and the BSYNC sensor 73 is the predetermined distance.

Neither the first embodiment in which only the HSYNC light sensor 31 (see FIG. 1) is employed nor the second embodiment in which both the HSYNC light sensor 31 and the BSYNC sensor 73 are employed makes any assumption about beam spacings as a function of time other than that they are greater than or equal to two pel times. However, a third embodiment uses only the HSYNC light sensor 31 where the beam separation time of each of the remaining beams from the lead beam is large enough for the HSYNC light sensor 31 to generate distinct pulses for the lead beam and any one of the remaining beams during the same scan.

Figure 13:
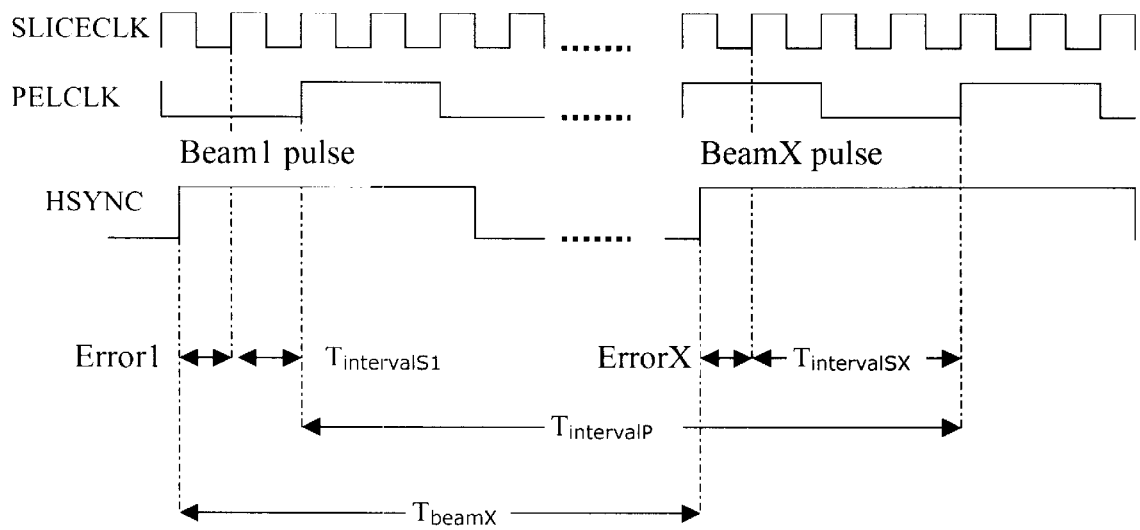
FIG. 13 is a timing diagram of the relation between pulses produced by a light sensor, a pel clock, and a slice clock in a third embodiment of the present invention.

When these distinct pulses can be obtained in the same scan, the time interval $T_{beamX}$ for each of the laser beams in an N-beam system with X ranging from 2 to N can be directly measured at the beginning of each scan. As shown in FIG. 13, measurement of the time interval $T_{beamX}$ begins when the beam 1 illuminates the HSYNC light sensor 31 (see FIG. 1) to generate the first HSYNC pulse (see FIG. 13) and ends when the beam X illuminates the HSYNC light sensor 31 (see FIG. 1) to generate the second HSYNC pulse (see FIG. 13). All of the other laser beams are turned off by the measurement control circuitry 50 (see FIG. 9) during the time that they could illuminate the HSYNC light sensor 31 (see FIG. 1).

Thus, the beam separation time of each of the remaining beams from the beam 1 is measured directly and may be expressed as:

$$T_{beamX} = \text{Error1} + T_{intervalS1} + T_{interval1P} - T_{intervalSX} - \text{ErrorX} \quad (16).$$

Rearranging equation (16):

$$T_{beamX} = T_{interval1P} + (T_{intervalS1} - T_{intervalSX}) + (\text{Error1} - \text{ErrorX}) + tm \quad (17).$$

As previously discussed, each of the error terms may vary from 0–1 slice. However, since there are only two error terms in equation (17) and one is positive while the other is negative, the total error for measurement has been reduced to ±1 slice. Measurement variation due to mirror motor velocity ripple is eliminated as in the second embodiment in which both the HSYNC light sensor 31 and the BSYNC sensor 73 are utilized. However, the third embodiment does not require the BSYNC sensor 73.

Because the beam separation times can be ascertained in a single scan in the third embodiment, the measurement control circuitry 50 (see FIG. 9) operates differently than for the other embodiments. In the third embodiment, the beam 1 is always permitted to illuminate the HSYNC light sensor 31 and the decoder 55 (see FIG. 9) is always enabled to allow one of the remaining beams to illuminate the HSYNC light sensor 31 (see FIG. 1).

The outputs of the measurement control circuitry 50 (see FIG. 9) are only active for one scan of the F–1 scans during which a measurement occurs. Accordingly, the first scan of a measuring cycle is used to measurement the beam separation time. Therefore, the output of the comparator 53 (see FIG. 9) is employed to increment the beam counter 67.

When using only the HSYNC light sensor 31 (see FIG. 1) in the three scan measurement cycle, it should be understood that compensation must be made for the beam 1 not being sensed by the HSYNC light sensor 31 in each third scan of a measurement cycle during printing. This necessitates that the Left Margin Delay (see FIG. 4) be reduced for each of the beams by the amount of delay shown in FIG. 4 for the beam being measured. Otherwise, the sensing of the beam 2, for example, by the HSYNC light sensor 31 (see FIG. 1) would cause printing to occur after the left margin 37 (see FIG. 4) by the $T_{beam2}$ Delay.

Thus, during the third scan of a three scan cycle in which the beam 2 is sensed by the HSYNC light sensor 31 (see FIG. 1), each of the beams has its Left Margin Delay (see FIG. 4) reduced by the $T_{beam2}$ Delay. Likewise, for example, during the third scan of a three scan cycle in which the beam X is sensed by the HSYNC light sensor 31 (see FIG. 1), each of the beams has its Left Margin Delay (see FIG. 4) reduced by the $T_{beamX}$ Delay. This is controlled by the imaging control circuitry 32 (see FIG. 9).

This compensation is not necessary when using both the HSYNC light sensor 31 (see FIG. 1) and the BSYNC sensor 73 or when using only the HSYNC light sensor 31 to sense both the beam 1 and the beam X (see FIG. 13) in the same scan. This is because the beam 1 is sensed during each scan by the HSYNC light sensor 31 so that the high SYNC pulse produced by it being sensed by the HSYNC light sensor 31 identifies the correct Left Margin Delay (see FIG. 4) for printing.

It should be understood that the imaging control circuitry 32 (see FIG. 9) could be configured to make $T_{beamX}$ calculations by using the same facet 23 (see FIG. 1) of the mirror 22 for all calculations. The imaging control circuitry 32 (see FIG. 9) also could be configured to make $T_{beamX}$ calculations by using the same facet 23 (see FIG. 1) for both time intervals involved in a single calculation and selecting another of the facets 23 for the next calculation.

An advantage of this invention is that it prevents separation drift of beams that causes image distortion. Another advantage of this invention is that no clock has to be stopped and restarted. A further advantage of this invention is that it can use only a single light beam sensor irrespective of the number of beams simultaneously scanning a recording medium. Still another advantage of this invention is that it does not require more than two sensors irrespective of the number of beams simultaneously scanning a recording medium. A still further advantage of this invention is that the beams do not have to be precisely aligned vertically. Yet another advantage of this invention is that it is less expensive than systems requiring multiple sensors. Yet still another advantage of this invention is that it can measure beam separation times during printing.

For purposes of exemplification, preferred embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. An apparatus for continuously measuring and compensating for beam separation in a multi-beam raster system including:

producing means for producing a plurality of laser beams;

selecting means for selecting one of the plurality of laser beams as a lead beam;

causing means for causing the plurality of laser beams to continuously scan a recording medium simultaneously in parallel scan lines in which the plurality of laser beams is separated from each other;

determining means for determining the separation time in the scan direction of each of the remainder of the plurality of laser beams from the lead beam;

storage means for storing the determined separation time in the scan direction of each of the remainder of the plurality of laser beams from the lead beam;

delay means for delaying data transmission for each of the remainder of the plurality of laser beams in accordance with the determined separation time in the scan direction of each of the remainder of the plurality of laser beams from the lead beam;

and changing means for changing the determined separation time in the scan direction of each of the remainder of the plurality of laser beams from the lead beam in said storage means when said determining means determines a different separation time from the stored separation time.

2. The apparatus according to claim 1 including:

averaging means for averaging a predetermined number of separation times by said determining means of the determined separation time in the scan direction of each of the remainder of the plurality of laser beams from the lead beam;

and said changing means being effective only when said averaging means produces a different average separation time for a specific beam than the stored separation time.

3. The apparatus according to claim 2 in which said determining means determines the time for the lead beam to travel a predetermined distance prior to determination of the separation time in the scan direction of each of the remainder of the plurality of laser beams from the lead beam.

4. The apparatus according to claim 3 in which said determining means includes:

sensing means for sensing a beam at at least one predetermined location during each scan;

control means for causing said sensing means to sense the lead beam during at least a first scan and another of the remainder of the plurality of laser beams during a scan after sensing of the lead beam to determine the time for the lead beam to travel the predetermined distance is completed;

and said control means causing said sensing means to repeat the same number of scans for each, if any, of the remainder of the plurality of laser beams and then to begin again with the next of the remainder of the plurality of laser beams.

5. The apparatus according to claim 4 in which:

said sensing means includes a single sensor at one predetermined location;

and said control means causes said single sensor to sense only the lead beam during each of first and second scans to determine the time for the lead beam to travel the predetermined distance and only one of the remainder of the plurality of laser beams during a third scan.

6. The apparatus according to claim 5 including light control means for controlling when each of the plurality of laser beams illuminates said single sensor.

7. The apparatus according to claim 4 in which:

said sensing means includes two sensors at two predetermined locations separated the predetermined distance;

and said control means causes each of said two sensors to sense the lead beam during a first scan to determine the time for the lead beam to travel the predetermined distance and a first of said two sensors to sense only the lead beam during a second scan and a second of said two sensors to sense only one of the remainder of the plurality of laser beams during the second scan to determine the separation time of the one beam from the lead beam.

8. The apparatus according to claim 7 including light control means for controlling when the lead beam illuminates each of said two sensors and when each of the remainder of the plurality of laser beams illuminates the second of said two sensors.

9. The apparatus according to claim 3 in which said determining means includes detecting means for detecting the laser beams at at least one predetermined location.

10. The apparatus according to claim 9 in which said detecting means includes a single light sensor.

11. The apparatus according to claim 3 in which said determining means includes detecting means for detecting the laser beams at two predetermined locations separated the predetermined distance.

12. The apparatus according to claim 11 in which said detecting means includes two light sensors at two predetermined locations separated the predetermined distance.

13. The apparatus according to claim 3 in which said determining means includes:

sensing means for sensing a beam at at least one predetermined location during each scan;

control means for causing said sensing means to sense the lead beam during at least a first scan and another of the remainder of the plurality of laser beams during a scan after sensing of the lead beam to determine the time for the lead beam to travel the predetermined distance is completed;

and said control means causing said sensing means to repeat the same number of scans for each, if any, of the remainder of the plurality of laser beams and then to begin again with the next of the remainder of the plurality of laser beams.

14. The apparatus according to claim 2 in which said determining means includes:

sensing means for sensing a beam at one predetermined location during each scan;

control means for causing said sensing means to sense the lead beam first and then one of the remainder of the plurality of laser beams during a single scan to determine the separation time in the scan direction of one of the remainder of the plurality of laser beams from the lead beam;

and said control means causing said sensing means to repeat the single scan for each, if any, of the remainder of the plurality of laser beams.

15. The apparatus according to claim 14 including:

said sensing means including only one sensor at one predetermined location;

and light control means for controlling when each of the plurality of laser beams illuminates said single sensor.

16. The apparatus according to claim 2 including activation causing means for causing activation of said averaging means each time that said storage means stores another determined separation time for a specific beam.

17. The apparatus according to claim 1 in which said determining means includes:

first and second clock means for producing synchronous pulses, said second clock means having a multiple clock rate of the clock rate of said first clock means;

sensing means for sensing at least one beam at at least one predetermined location a during at least one scan;

control means for causing said sensing means to sense the lead beam prior to sensing one of the remainder of the plurality of laser beams;

said sensing means including producing means for producing pulses asynchronous with the synchronous pulses of said first clock means and said second clock means for each beam that is sensed with at least one of the pulses representing sensing of the lead beam and another of the pulses representing sensing of one of the remainder of the plurality of laser beams;

and means for using the time intervals of the asynchronously produced pulses relative to the synchronous pulses of said first clock means and said second clock means to enable the separation time in the scan direction of each of the remainder of the plurality of laser beams from the lead beam to be determined.

18. The apparatus according to claim 17 in which said control means causes said sensing means to sense both the lead beam and one of the remainder of the plurality of laser beams at one predetermined location during a single scan.

19. The apparatus according to claim 17 in which said control means causes said sensing means to sense only the lead beam at one predetermined location during two consecutive scans and one of the remainder of the plurality of laser beams at the one predetermined location during a third scan.

20. The apparatus according to claim 17 in which:

said sensing means includes first sensing means at a first predetermined location and second sensing means at a second predetermined location separated a predetermined distance from the first predetermined location;

and said control means causes each of said first sensing means and said second sensing means to sense the lead beam during a first scan and said first sensing means to sense only the lead beam during a second scan and said second sensing means to sense only one of the remainder of the plurality of laser beams during the second scan.

21. A method for continuously measuring and compensating for beam separation in a multi-beam raster system including:

producing a plurality of laser beams;

selecting one of the plurality of laser beams as a lead beam;

continuously scanning the plurality of laser beams simultaneously over a recording medium in parallel scan lines in which the plurality of laser beams is separated from each other;

determining the separation time in the scan direction of each of the remainder of the plurality of laser beams from the lead beam;

storing the determined separation time in the scan direction of each of the remainder of the plurality of laser beams from the lead beam;

delaying data transmission for each of the remainder of the plurality of laser beams in accordance with the determined separation time in the scan direction of each of the remainder of the plurality of laser beams from the lead beam;

and changing the stored determined separation time in the scan direction of each of the remainder of the plurality of laser beams from the lead beam when a different separation time is determined from the stored separation time.

22. The method according to claim 21 including:

averaging a predetermined number of the determined separation times in the scan direction of each of the remainder of the plurality of laser beams from the lead beam;

and changing the stored determined separation time in the scan direction of each of the remainder of the plurality of laser beams from the lead beam only when a different average separation time is determined than the stored separation time.

23. The method according to claim 22 including determining the time for the lead beam to travel a predetermined distance prior to determining the separation time in the scan direction of each of the remainder of the plurality of laser beams from the lead beam.

24. The method according to claim 23 including:

sensing at least one of the beams at at least one predetermined location during each scan;

controlling the beam sensing to sense the lead beam during at least a first scan and another of the remainder of the plurality of laser beams during a scan after sensing of the lead beam is completed in which the time for the lead beam to travel the predetermined distance is determined;

and repeating the same number of scans for each, if any, of the remainder of the plurality of laser beams and then beginning again with the next of the remainder of the plurality of laser beams.

25. The method according to claim 24 including:

sensing at only one predetermined location;

and sensing only the lead beam during each of first and second scans to determine the time for the lead beam to travel the predetermined distance and only one of the remainder of the plurality of laser beams during a third scan.

26. The method according to claim 25 including controlling when each of the plurality of laser beams is sensed.

27. The method according to claim 24 including:

sensing at two predetermined locations separated the predetermined distance;

and sensing the lead beam at each of the two predetermined locations during a first scan to determine the time for the lead beam to travel the predetermined distance and sensing only the lead beam at a first of the two predetermined locations during a second scan and sensing only one of the remainder of the plurality of laser beams during the second scan at only a second of the two predetermined locations to determine the separation time of the one beam from the lead beam.

28. The method according to claim 21 including averaging the predetermined number of the determined separation times in the scan direction of each of the remainder of the plurality of laser beams from the lead beam each time that another separation time is determined for a specific beam.

* * * * *